United States Patent
Huddleston

[11] Patent Number: 5,815,978
[45] Date of Patent: Oct. 6, 1998

[54] SOFT BAIT FISH LURE

[76] Inventor: Samuel M. Huddleston, P. O. Box 2302, Camarillo, Calif. 93011-2302

[21] Appl. No.: 767,334
[22] Filed: Dec. 16, 1996
[51] Int. Cl.$^6$ .................................................. A01K 85/00
[52] U.S. Cl. ......................................... 43/42.09; 43/42.39
[58] Field of Search ............................... 43/42.09, 42.15, 43/42.24, 42.45, 42.47, 42.48, 42.11, 42.39

[56] References Cited

U.S. PATENT DOCUMENTS

| | | | |
|---|---|---|---|
| 1,539,365 | 5/1925 | Masoner | 43/42.15 |
| 1,786,568 | 12/1930 | Kutz | 43/42.15 |
| 1,816,725 | 7/1931 | Freeman | 43/42.09 |
| 2,183,816 | 12/1939 | Lovelace | 43/42.09 |
| 2,254,949 | 9/1941 | Messacar | 43/42.09 |
| 2,556,533 | 6/1951 | Graaten | 43/42.15 |
| 2,590,461 | 3/1952 | Rasch | 43/42.15 |
| 3,218,750 | 11/1965 | Lewin | 43/42.45 |
| 3,490,165 | 1/1970 | Thomassin | 43/42.47 |
| 3,735,518 | 5/1973 | Kleine | 43/42.15 |
| 3,979,853 | 9/1976 | Storm | 43/42.09 |
| 4,437,257 | 3/1984 | Kluge | 43/42.45 |
| 5,094,026 | 3/1992 | Correll | 43/42.11 |
| 5,301,453 | 4/1994 | Terrill | 43/42.09 |
| 5,381,620 | 1/1995 | Gibbs | 43/42.09 |
| 5,490,345 | 2/1996 | Infinger | 43/42.24 |
| 5,522,170 | 6/1996 | Cole | 43/42.11 |
| 5,678,350 | 10/1997 | Moore | 43/42.15 |

Primary Examiner—Kurt Rowan
Attorney, Agent, or Firm—Roger A. Marrs

[57] ABSTRACT

A fish lure is disclosed having an over-all length comprising two parts. One head part is composed of a hard, rigid material and the other part is composed of a highly flexible soft material representing a fish tail. Both parts include flat surfaces opposing each other for receiving a joining substance such as glue and a pin and hole arrangement is employed for guiding the parts together. The soft part is provided with a cutout on each side of the part to define a hinge about which a fin portion pivots. The fin portion terminates the end of the soft part. A weighted member and lead line and hook connections are embedded in the rigid part as well as a diving plate. The exterior surface of both parts represents actual fish coloring.

7 Claims, 1 Drawing Sheet

U.S. Patent    Oct. 6, 1998    5,815,978
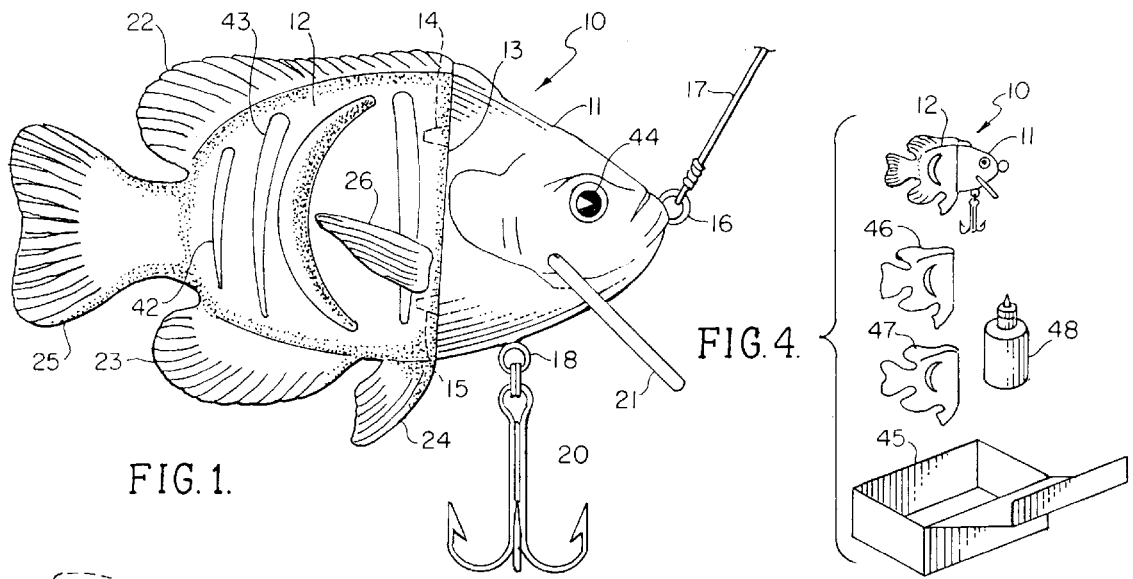
FIG. 1.
FIG. 4.
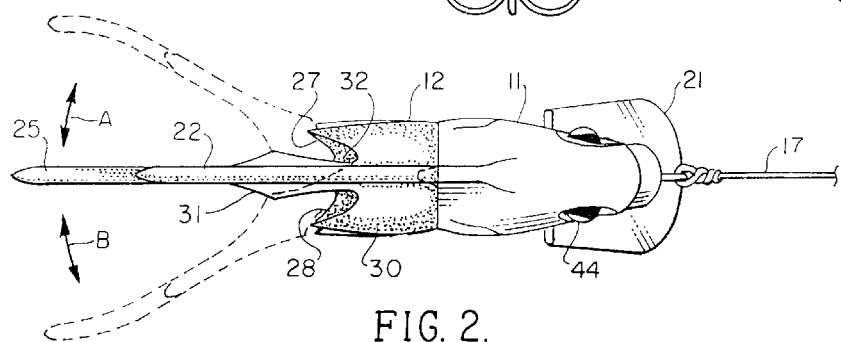
FIG. 2.
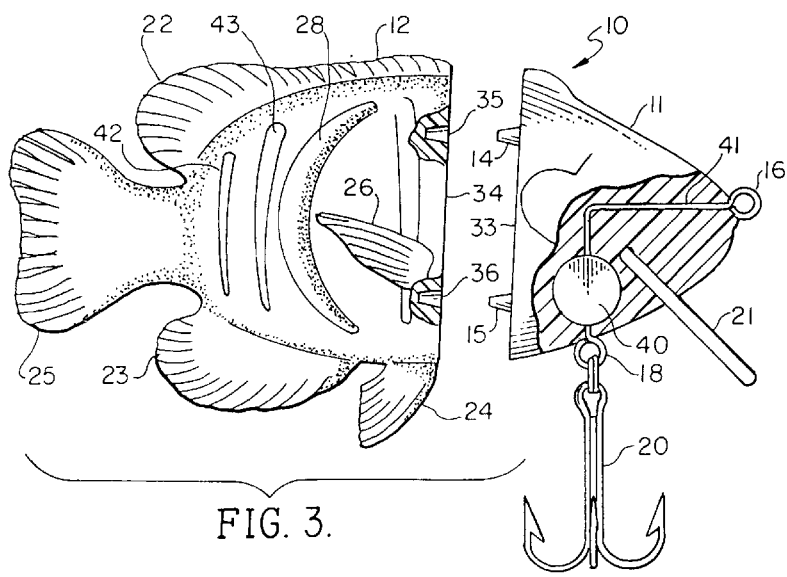
FIG. 3.

SOFT BAIT FISH LURE

BACKGROUND OF THE INVENTION

1. Field of the Invention

The present invention relates to the field of fishing lures, and more particularly to a novel two-part lure having the rearmost part composed of soft and flexible material and wherein the flexible part is provided with cutouts reducing the diameter of the part so that the soft part will flex and pivot to represent a swimming fish as the lure is drawn through the water.

2. Brief Description of the Prior Art

In the past, it has been the conventional practice to use a variety of fishing lures to attract fish in an attempt to catch fish. One such lure is disclosed in U.S. Letters Design Patent 369,200 and is called a hard bait lure since the two parts of the lure are composed of hard and rigid materials. The two parts are joined together by an eyelet and hook arrangement so that the rearmost part of the lure will pivot on the hook and eye arrangement to represent a swimming fish. The extreme end of the rearmost part terminates in a flexible fin but the fin does not pivot. Because the fin does not pivot and because the two parts are of a rigid construction and material, simulated swimming of a fish is not realistic. Also, such conventional hard bait lures may include flexible components representing fins but these flexible components do not pivot with respect to the body of the fish and do not simulate accurately the flexing movement of a fish.

Therefore, problems and difficulties have been encountered with hard bait fish lures that stem from the fact that the swimming of a fish is not accurately experienced during a fishing procedure and the lure does not appear to be realistic to fish intended to be caught. Furthermore, such hard bait lures require extensive labor intensive operations since the lures are generally composed of wood and require the fitting of the two rigid parts together by a hinge mechanism.

Therefore, a long-standing need has existed to provide a more realistic fish lure which not only looks more like a fish but which swims to simulate the swimming of an actual fish. Such a lure should be composed of a soft and flexible material not only for the fin construction but for the body construction as well.

SUMMARY OF THE INVENTION

Accordingly, the above problems and difficulties are avoided by the present invention which provides a novel soft bait fish lure having an elongated body composed of two parts of which the head part is composed of a rigid and hard material while the rearmost part representing the rearmost body and tail fin of the lure is composed of a soft and flexible material. The two parts are joined together by an adhesive means so as to provide an integral lure. The rearmost body part of soft material includes cutouts on each side of the rearmost part to reduce the thickness so that an integral hinge is formed permitting the tail fin to flex and move simulating swimming motion as the lure is drawn through the water. Also, additional dorsal and swim fins and integrally formed with the soft rearmost body portion so that they are integral therewith and further represent a visual representation of an actual fish. The front or head part of the lure includes means for attachment for fishing line and a hook as well as for accommodating a diving fin or plate so that the lure is maintained submerged while being drawn through the water. Guide means are included for aligning the head part with the rearmost tail part during attachment and securement and the parts of the lure are readily storable in a box or container with adhesive in a tube or can so that attachment of the two parts can be made while the fisherman is at a fishing site.

Therefore, it is among the primary objects of the present invention to provide a novel soft bait fishing lure which looks and feels similar to an actual fish.

Another object of the present invention is to provide a soft bait fishing lure which will appear to swim while submerged as an added attraction to gaining the attention of a fish intended to be captured.

Another object of the present invention is to provide a novel soft bait fish lure which has a hard and rigid head part and a soft and flexible rearmost body part attached to the head part and wherein the rearmost flexible part includes cutouts defining an integral hinge so that the tail of the lure will flex and is pliable enough to distort while being drawn through the water to represent a swimming fish.

Yet a further object of the present invention is to provide a novel fishing lure which is composed of a rearmost body portion of soft and pliable material having an integral hinge while the head part of the lure is composed of a rigid material containing a weighted member and means for connecting line and hooks thereto.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a side-elevational view of the novel soft bait fish lure of the present invention;

FIG. 2 is a top plan view of the fish lure shown in FIG. 1;

FIG. 3 is an exploded view of the fish lure shown in FIGS. 1 and 2 illustrating the two parts of the lure; and FIG. 4 is an exploded view showing a kit for storing the respective parts of the fish lure shown in FIGS. 1–3 so that assembly can be made at a fishing site.

DESCRIPTION OF THE PREFERRED EMBODIMENT

Referring to FIG. 1, the novel soft bait fishing lure of the present invention is illustrated in the general direction of arrow 10 and is illustrated as comprising an elongated body having a head part 11 which is composed of a hard and rigid material and a rearmost part 12 composed of a soft, flexible material. The forward part 11 may be composed of a plastic composition which hardens while the rearmost section or part 12 may be composed of a soft and pliable plastic such as hot melt "Plastisol" material which is readily available on the market. It can be seen that the head part or section 11 is joined to the rearmost part or section 12 along a join line 13. The join line represents immediatel surface areas of the two parts which may be joined together utilizing a plastic adhesive material or the like. In order to guide and align the parts together during the adhesive procedure, guide pins, such as pins 14 and 15, are employed that are indexed with and inserted into corresponding openings.

The rigid head part 11 includes a connecting eyelet 16 to which a lead line 17 may readily be attached and an eyelet 18 is provided to which a hook 20 may be attached. Also included is a diving plate 21 which is fixedly secured to the underside of the rigid head 11 so that ram water bears against the diving plate 21 to maintain the lure in a submerged condition during a fishing procedure as the lure is drawn through the water.

The rearmost section or part 12 includes integral fins 22 and 23 serving as dorsal fins while fin 24 is also used in the combination to emulate an existing fish. The rearmost section 12 terminates in an integral flexible tail fin 25 and side fins are indicated by numeral 26. Fins 22–26 inclusive are integrally formed with the material of the rearmost body part 12 and are pliable so that as the lure is drawn through the water, the fins will have a tendency to wiggle or wobble, depicting a real fish.

Referring now in detail to FIGS. 1 and 2, it can be seen that the rearmost section 12 is provided with a pair of cutouts 27 and 28 which greatly reduce the thickness of the rearmost portion so as to establish an integral hinge between the portion 30 that is attached to the rigid part 11 and a highly flexible portion 31 which terminates in the rear fin 25. FIG. 2 illustrates in broken lines, a pivoting motion for the section or portion 31 as the soft bait is drawn through the water. The portion 31 will wiggle to either the right side or the left side of the lure and the fins 22–26 will also flex to represent a swimming motion. The section 31 will either oscillate in the direction of arrow A or in the direction of arrow B. Flexing or wobbling of the rearmost body portion 12 and particularly the section 31 is about the integral hinge which is identified by numeral 32.

Referring now in detail to FIG. 3, it can be seen that the pins 14 and 15 are carried on surface 33 of the hard head part 11 and that surface 33 is intended to be joined with the surface of the rearmost body part 12. The surface is indicated by numeral 34 which is intended to be joined with surface 33. The apertures into which the pins 14 and 15 are to be inserted are identified by numerals 35 and 36 respectively. Glue may also be placed into these receptacles so that the pins are firmly joined as well as the surfaces 33 and 34.

FIG. 3 also illustrates the embedding of a weighted member such as a lead weight represented by numeral 40 within the material of the rigid and hard head part 11. A support wire 41 is also embedded in part 11 and may carry the weight 40 thereon with the eyelets 16 and 18 carried on opposite ends of the wire so as to reside outside or exteriorly of the part 11. The diving bill or plate 21 is disposed between the two eyelets and is disposed at an angle with respect to the longitudinal axis of the lure body.

As seen in FIGS. 1, 2 and 3, the exterior surface of the lure is coated or painted so as to resemble details of the fish which include the eye as well as possibly reflecting stripes, such as stripes 42 and 43. Preferably, the fish eyes are separate beads or other structures which protrude from the rigid head part 11. Such an eye is represented by numeral 44.

Referring now to FIG. 4, it is emphasized that the lure of the present invention may be stored or carried in kit form by placing the components into a box or container 45. The assembled fish is illustrated by numeral 10 and this lure may be used in a fishing procedure until the soft rearmost portion 12 has been destroyed, fatigued or worn out through use, at which time, the rigid head portion or part 11 may be reused by attaching a new tail as represented by numeral 46 or 47. Also, in the kit is a can of adhesive 48 so that a fisherman at a fishing site can readily take a spare rearmost portion 12, represented by numeral 46, from the container 45 and apply a coating of glue or adhesive to the respective surfaces 33 and 34 and join the previously used head part 11 to the new tail part 46. Now the lure can be ready for immediate use by the fisherman.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A fish lure comprising:

an elongated body having a head part composed of a hard, rigid, non-flexible material and a tail part composed of a highly flexible, soft and pliable material;

said tail part having sides with a cut-out on each side defining an integral flexible section permitting said tail part to flex and wobble with respect to said part;

securement means disposed between said head part and said tail part to secure said head part to said tail part in fixed non-movement relationship;

said securement means includes opposing flat surfaces provided on said head part and said tail part mateable to align said head part with said tail part;

means disposed on said opposing flat surfaces fixedly securing said head part to said tail part;

alignment means for registering said head part with said tail part including at least one pin outwardly projecting from a selected one of said opposing flat surfaces indexed for insertion into a corresponding opening in the other one of said opposing flat surfaces;

a section between said cut-out on each of said sides constitutes a flexible member allowing said tail part to flex and wobble with respect to said head part;

a weight member embedded in said head part;

a hook movably attached to said head part;

an angled plate disposed on said head part serving as a diving fin;

a lead wire having opposite loop ends joined by a mid-section bent at a 90 degree angle;

said weight member secured to said lead wire; and said loop ends externally exposed to said head part.

2. A fish lure comprising:

an elongated fish body having a forward head member composed of a hard, rigid, non-flexible material and a rear tail member composed of a soft, pliable and flexible material;

said rear tail member attached to said forward head member in an in-line relationship;

said rear tail member having a midsection terminating in a tail fin;

said rear tail member provided with an area of reduced thickness in said midsection providing bending action thereof whereby said fish body simulates swimming of a fish as the lure is drawn through the water;

indexing means carried on each of said forward and said rear members for aligning said forward and said rear members together to resemble a fish;

securement means disposed between said forward head member and said rear tail member integrally joining together to provide a single unitary construction;

a weight member embedded in said head part;

a hook movably attached to said head part;

an angled plate disposed on said head part serving as a diving fin;

a lead wire having opposite loop ends joined by a mid-section bent at a 90 degree angle;

said weight member secured to said lead wire; and said loop ends externally exposed to said head part.

3. The fish lure as defined in claim 2 wherein:

said securement means includes opposing flat surfaces provided on said head part and said tail part mateable to align said head part with said tail part; and adhesive means disposed on said opposing flat surfaces fixedly securing said head part to said tail part.

4. The fish lure as defined in claim 3 including:

alignment means for registering said head part with said tail part including at least one pin outwardly projecting from a selected one of said opposing flat surfaces indexed for insertion into a corresponding opening in the other one of said opposing flat surfaces.

5. The fish lure as defined in claim 4 wherein:

a section between said cut-out on each of said sides constitutes a flexible member allowing said tail part to flex and wobble with respect to said head part.

6. The fish lure as defined in claim 2 wherein:

said tail part terminates in a tail fin extending from a body section incorporating said cut-outs on each side thereof; and at least two areas of reduced thickness provided between said cut-outs and said tail fin for increasing flexibility of said tail part to simulate the swimming of a fish.

7. The fish lure of claim 6 including:

flexible dorsal and belly fins carried on said tail part cooperating in conjunction with said tail fin, said areas of reduced thickness and said integral flexible section to simulate the swimming action of a fish as the lure is drawn through water.

* * * * *